United States Patent [19]

Wolfe et al.

[11] Patent Number: 4,832,539
[45] Date of Patent: May 23, 1989

[54] DISTRIBUTION OF GAS ENTRAINED PARTICLES

[75] Inventors: William C. Wolfe, Clinton, Ohio; George H. Weidman, Plano, Tex.

[73] Assignee: The Babcock & Wilcox Company, New Orleans, La.

[21] Appl. No.: 486,613

[22] Filed: Apr. 20, 1983

[51] Int. Cl.⁴ .............................................. B65G 53/52
[52] U.S. Cl. .................................. 406/181; 406/191; 266/182
[58] Field of Search ...................... 406/181, 191, 195; 138/DIG. 11; 266/182

[56] References Cited

U.S. PATENT DOCUMENTS

| | | | |
|---|---|---|---|
| 2,827,334 | 3/1958 | Sanborn et al. | 406/195 X |
| 3,204,942 | 9/1965 | Matthys et al. | 406/181 X |
| 3,310,349 | 3/1967 | Tilley et al. | 406/195 X |
| 4,027,920 | 6/1977 | Wennerstrom | 406/181 |
| 4,527,776 | 7/1985 | Scheel | 266/182 X |
| 4,685,843 | 8/1987 | Kelm | 406/181 |

FOREIGN PATENT DOCUMENTS

| | | | |
|---|---|---|---|
| 0184565 | 6/1986 | European Pat. Off. | 406/181 |
| 273423 | 12/1986 | Japan | 406/181 |
| 273424 | 12/1986 | Japan | 406/181 |

Primary Examiner—Sherman D. Basinger
Assistant Examiner—James M. Kannofsky
Attorney, Agent, or Firm—Robert J. Edwards; D. Neil LaHaye; James C. Simmons

[57] ABSTRACT

A pneumatic transport and distribution system for passing gas-entrained particles to a distributor which then distributes the particles through a plurality of distributor outlets. At least a portion of inlet conduit extending vertically to the distributor is of square or other non-circular inner cross-section for prevention of "spiralling" of the particles as they emanate from the distributor inlet into the distributor to thereby improve the flow distribution of the particles from the distributor outlets.

19 Claims, 1 Drawing Sheet

DISTRIBUTION OF GAS ENTRAINED PARTICLES

The present invention relates generally to apparatus and method for the transport and distribution of gas entrained particles. More particularly, the present invention relates to apparatus and a method for dividing a flow of gas entrained particles into a plurality of effluent streams thereof.

U.S. Pat. No. 3,204,942 to Matthys et al. discloses an apparatus for distributing an incoming stream of gas entrained particles into a multiplicity of streams. The apparatus thereof comprises an unobstructed chamber having its upper end closed and its lower end formed with a central inlet connected to inlet piping of circular cross-section, and including a plurality of spaced outlets disposed along a common horizontal plane in the upright chamber wall. During operation of this distributor of Matthys et al., the jet effect of the incoming stream penetrates the full length of the chamber and impinges on its upper end thereby giving rise to a recirculation effect with a portion of the particle stream being discharged through the outlets while the remainder circulates to the bottom of the chamber and forms, in equilibrium condition, a reservoir of particulate matter that is re-entrained in the incoming stream.

It is an object of the present invention to improve the distribution of the effluent streams so that each stream is of more nearly equal weight and density.

It is a further object of the present invention to provide an improved pulverized coal injection system whereby an increased amount of coal can be burned at the tuyeres of a blast furnace so that less of the more expensive coke need be burned for the same capacity for an overall cost savings.

It is a further object of the present invention to provide more uniform combustion throughout the cross-sectional area of a blast furnace to prevent local upsets in combustion conditions. Such local upsets may cause severe channeling of the gases up through the furnace stack or the formation of undesirable ash and slag ledges immediately above the combustion zone, either of which would seriously affect the overall operation of the blast furnace.

The various features of novelty which characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

IN THE DRAWINGS

Figure 1:
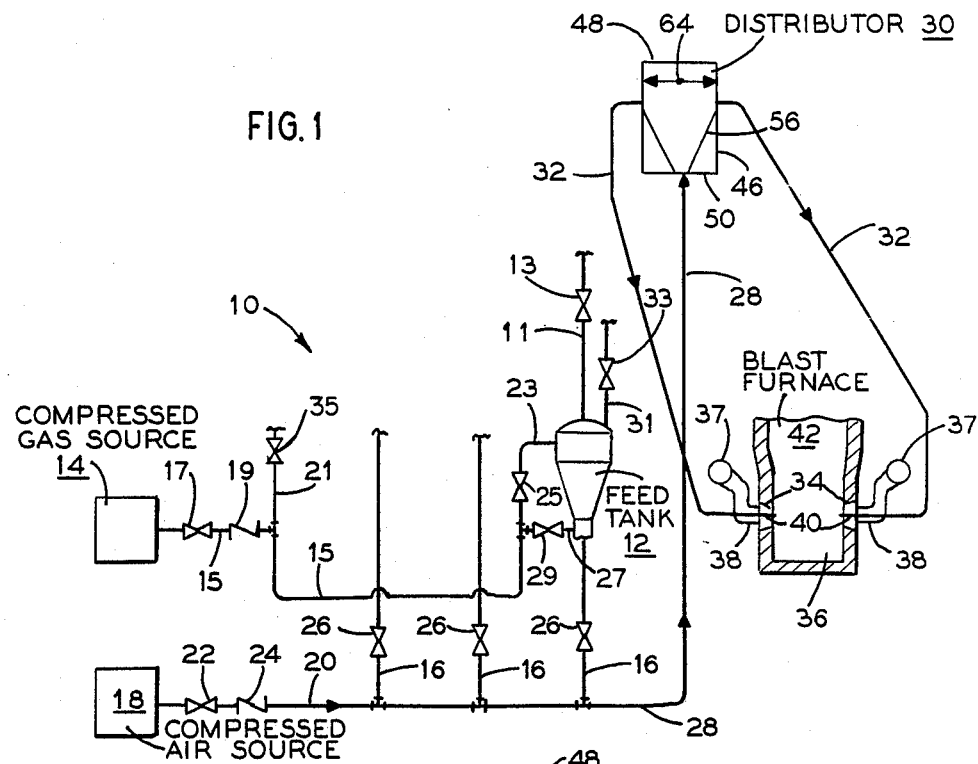
FIG. 1 is a schematic diagram of a portion of blast furnace pulverized coal pneumatic transport system embodying the present invention.

FIG. 1 illustrates generally at 10 a system for the conveying of airborne pulverized coal to a blast furnace. However, the present invention is not limited thereto, but is meant to also encompass systems for the distribution of various other pneumatically transported particle-form materials. The term "pneumatic" is meant to refer to the use of gas or gaseous mixtures such as, for example, compressed air for transport of such materials.

One or more feed tanks illustrated at 12, pressurized by inert gas, supplies pulverized coal particles to respective lines 16. As used herein, the term "inert gas" is meant to refer to a non-combustible and non-explosive gas such as nitrogen. For clarity, only one of three such feed tanks is shown in FIG. 1. The coal particles are supplied to feed tank 12 from a storage tank (not shown) through conduit 11 which is provided with shutoff valve 13. The inert gas is delivered by compressed gas source 14 through a supply conduit 15 at a pressure sufficient to maintain coal flow from the feed tank 12 into a transport conduit 28 at maximum anticipated blast furnace demand rate and against the combined transport system pressure drop and the pressure within the bosh 42 of the blast furnace 36. The gas supply conduit 15 includes a control valve 17 and a check valve 19. Conduit 21 having shut-off valve 35 provides inert gas supply from source 14 for aeration of the storage tank. Pressurization of the feed tank 12 is accomplished through conduit 23 which connects the tank 12 with gas supply conduit 15 and includes control valve 25. Aeration of the feed tank 12 is accomplished through conduit 27 which connects tank 12 with gas supply conduit 15 and includes control valve 29. Inert gas such as nitrogen is preferred for pressurizing and aerating the feed tank 12 and for aerating the storage tank to preclude the possibility of coal ignition within the storage and feed tanks. Venting of the feed tank 12 is accomplished through line 31 which connects the tank 12 with a main vent conduit (not shown) and includes control valve 33. Although not necessary to a complete understanding of the present invention, an understanding of the preparation and transport of pulverized coal to the feed tanks and a more complete understanding of operation of the feed tanks may be obtained by referring to FIG. 1 and the accompaying description in U.S. Pat. No. 4,027,920 to Wennerstrom.

Pressurized air for pneumatic conveyance of the pulverized coal particles is supplied by a compressed air source illustrated at 18 discharging through line 20 which connects to lines 16 from the feed tanks and includes control and check valves 22 and 24 respectively. A shut off valve 26 is placed in the line 16 from each feed tank. The compressed air delivers the pulverized coal particles through inlet conduit 28 to one or more distributors 30. A plurality of feed conduits 32 leads from distributor 30 to individual tuyeres 34 of blast furnace 36 in a manner similar to that described in the aforementioned Matthys et al. patent. The number of distributors as well as the number of tuyeres served by each distributor is variable according to the requirements of the blast furnace. Blast air for the furnace 36 is heated by a battery of regenerative stoves (not shown) to a temperature of about 1800° Farenheit (982° Centigrade) or higher and is delivered through a duct (not shown) to a torus-shaped bustle pipe 37 and thereafter to the individual tuyeres 34 by way of gooseneck conduits 38. The coal-air stream from each feed conduit 32 is directed by corresponding nozzles illustrated at 40 into the tuyeres 34 of the blast furnace so that each stream is projected into the high temperature blast air being injected through the corresponding tuyere 34. Most of the coal combustion occurs in the tuyeres prior to the stream thereafter entering the bosh 42.

The quantity of pulverized coal delivered to the blast furnace 36 is regulated through pressurization valve 25 and vent valve 33 associated with the feed tank 12. In the event that the actual coal flow rate is less than the demand rate, the pressurization valve 25 will open thereby raising the feed tank pressure to increase the coal flow rate. Conversely, should the coal flow rate be greater than the demand rate, the vent valve 33 will open thereby reducing the feed tank pressure to decrease the coal flow rate.

The pressurized air used to transport the pulverized coal from the discharge of the feed tank 12 to the blast furnace 36 is regulated through valve 22 to maintain velocities which will assure steady flow and prevent the settling of coal while minimizing the quantity of relatively cold air being introduced into the blast furnace 36. The coal-air mixture is conveyed through inlet conduit 28 to the distributor 30 which divides it into a plurality of effluent streams of pulverized coal particles. The coal-air streams leaving the distributor 30 are conveyed through the respective conduits 32 to corresponding nozzles 40 for injection into the tuyeres 34 of blast furnace 36. The hot blast air which is introduced through the gooseneck conduits 38 into the tuyeres 34 mixes with the coal-air stream to promote rapid combustion of the coal.

Figure 2:
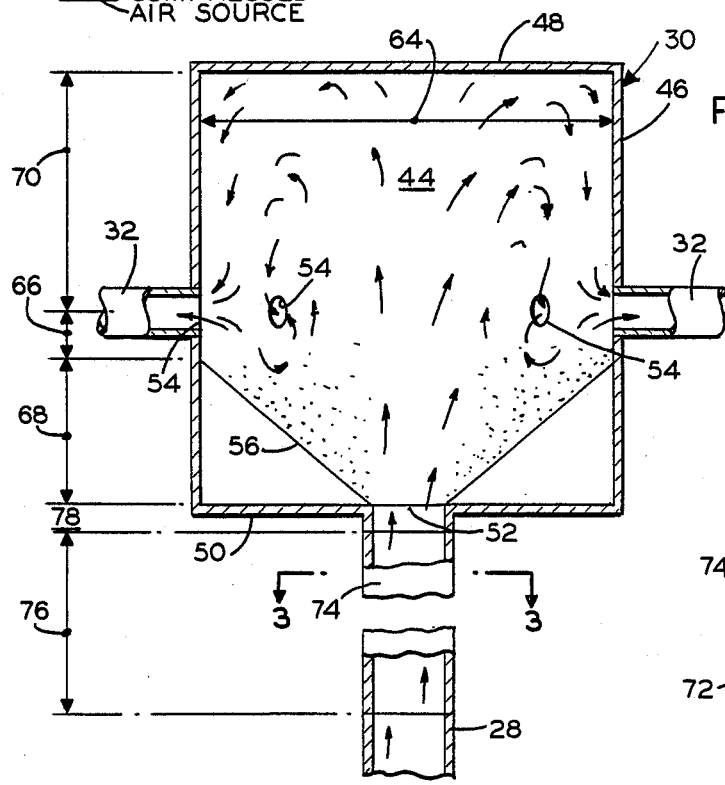
FIG. 2 is a sectional side view of a distributor for the system illustrated in FIG. 1.

Referring to FIG. 2, the distributor 30 is a vertically disposed right cylindrical chamber 44 formed by a tubular side wall 46, a top plate 48, and a bottom plate 50. The inlet conduit 28 is fitted into the central inlet opening 52 in the bottom plate 50, and extends therefrom axially (downwardly) with respect to the chamber 44. A plurality of equally sized outlet openings 54 are formed in spaced relation in a common horizontal plane in the side wall 46. The outlet pipes or conduits 32 are fitted into these openings 54 and extend radially outwardly from the chamber 44. Preferred distributor chamber diameters are discussed at column 4, lines 53 to 63, of the Matthys et al. patent, and preferred air/material ratios are discussed at column 3, lines 47 to 67, thereof. The Matthys et al. patent is incorporated herein by reference to the extent it is applicable to the present invention.

In operation of the distributor 30, a mixture of air and pulverized material is introduced axially into the chamber 44 through the inlet conduit 28. The mixture is subsequently discharged through the openings 54. As shown diagramatically in FIG. 2, the jet effect of the incoming stream penetrates the full length of the chamber 44 and impinges on the top plate 48 in accordance with conventional distributor operation. The jet then "mushrooms" and a downward recirculation of the mixture takes place with some of the mixture passing out of the chamber 44 through the openings 54. The portion of the mixture which does not leave the chamber 44 continues downwardly toward the bottom of the chamber 44 after which it is re-entrained in the incoming stream.

A frusto-conical bottom, illustrated schematically at 56 in FIG. 2, may be provided in the chamber 44 to avoid any accumulation in the bottom recesses of the chamber. As can be seen from the Figure, this bottom 56 has a downwardly diminishing diameter. Otherwise, there would be a tendency for material to accumulate on the bottom plate 50 adjacent the side wall 46 which could result in intermittent "slugging" of the material through the outlets 54, or could produce a fire hazard. Although the outlet openings 54 are shown in FIG. 2 as being evenly spaced circumferentially about the side wall 46, this uniform disposition of outlets is not considered essential to satisfactory operation, as indicated in the Matthys et al. patent.

It is a purpose of the distributor 30 to divide the mixture of carrier air and particle form fuel into a plurality of effluent streams of equal density and weight for introduction into the tuyeres 34 of blast furnace 36 as previously discussed. To effect optimum performance of the distributor for this purpose, the distributor 30 is vertically disposed, the outlets 54 are in a common horizontal plane, and the inlet conduit opening 52 is centrally positioned in the bottom plate 50 of the chamber 44. The single inlet conduit 28 is arranged to introduce the incoming stream axially (i.e., vertically) into the chamber 44 to assure uniform flow entering the distributor 30 to produce the symmetrical recirculation pattern described above. The inlet conduit 28 should extend vertically from the inlet 52 a distance which is preferably equal to at least about forty times its hydraulic radius. The hydraulic radius is the ratio of the inner cross-sectional area of a conduit in which a fluid is flowing to the inner perimeter of the conduit, and is commonly used by those of ordinary skill in the art to which this invention pertains to relate a conduit portion length to its cross-sectional dimensions for fluid flow calculations. In order to maintain equal distribution through all of the outlet conduits 32, the conduits 32 are preferably arranged and constructed so that equal back pressures are obtained at all of the outlets 54 of the distributor when there is equal flow through the outlets so that the pressure drop through each of the conduit flow paths 32 is equal. If necessary, flow restricters (not shown) may be placed in the conduits 32 to effect equality of pressure drop therethrough.

In an effort to improve the uniformity of distribution of effluent particles into the distributor outlets 54, the top plate 48 of a distributor 30 was removed and replaced with a plastic, see-through cover so that the motion of the particles striking the top plate 48 could be observed to thereby confirm a belief that the particles were not evenly distributed as they emanated from a circular inlet pipe. Although during normal operation of the distributor 30, there was too much coal flowing therethrough to clearly observe any pattern of coal particles striking the top plate 48, the relative motions of the particles could be observed during start-ups of the distributor 30, and it was observed that the particles would strike the top plate 48 in a pattern which may be characterized as a "spinning" or "whirlwind" pattern; that is, the particles would "bunch" and the particle "bunches" would strike the top plate 48 in a circular pattern over time. This pattern of the mixture of effluent particles emanating from a circular inlet pipe 28 may be characterized as "spiralling" or "roping" wherein, at a given instant in time at a given location along the pipe length, the particles will show up as a concentration of solids at a particular segment of the given cross-sectional area of the pipe 28. Inotherwords, the effluent particles may be said to concentrate together in a wave pattern which may be characterized as being in the shape of a rope strand during their travel through the inlet pipe 28. As the solids enter the distributor 30, this non-uniformity of distribution of solids in the effluent stream and the resulting non-uniformity of distribution of the solids striking the top plate 48 results in a distribution of solids into the outlets 54 the uniformity of which may be improved substantially if the "spiralling" or "roping" effect were reduced substantially or prevented.

It was not considered practical to attempt to solve this problem by predicting which outlet lines will have the higher solids rate because of the "spiralling" effect since the "spiralling" effect appears to be of a random character. Attempts to solve this problem by various other means were unsuccessful. It was conceived that a non-circular inlet conduit such as one of square inner cross-section might provide an even distribution of solids emanating from the distributor inlet and thus solve the problem.

A distributor of the type shown in FIGS. 1 and 2 was tested using mixtures of air and pulverized coal to determine its "efficiency" as a distributor when operating under pressure with inlet conduits of circular inner cross-sections (labeled as "circular" in the tables to follow) and with inlet conduits at least portions of the vertical length of which were of square inner cross-sections (labeled as square in the tables). In these tests, air/coal mixtures were introduced into the distributor 30 at measured velocities during a measured period of time, and the quantity of material issuing from each of the outlet pipes 32 was collected, weighed, and compared to determine the flow rates as well as the degree of flow unbalance to the several pipes 32. From these results, the degree of unbalance (a measure of distribution efficiency) was determined by calculating the sample standard deviation of distribution variation of the gas entrained particles at the distributor outlets.

Table I is a compilation of results obtained in tests on a distributor 30 wherein the flow velocity through the inlet was varied between about 60 and 100 ft. per sec. (18 to 30 meters per sec.). The distributor had an inner diameter illustrated at 64 of about 23 inches (58 cm.), the distance illustrated at 68 between the inlet and the top of the cone 56 was about 17.5 inches (44 cm.) and the distance illustrated at 66 between the top of the cone 56 and the centerplane of the outlets 54 was about 1.125 inches (2.86 cm.). The distance illustrated at 70 between the centerplane of the outlets 54 and the top plate 48 was about 12 inches (30 cm.). The distributor had 16 outlets equally spaced around the circumference thereof and each of which had an inside diameter of about 1.05 inches (2.67 cm.). Tests 1, 2, 5, and 6 were run using an inlet conduit 28 having a circular cross-section the inside diameter of which was about 3.1 inches (7.9 cm.) throughout its entire vertical length. During tests 3, 4, 7, and 8, a portion of the vertical circular conduit was replaced by conduit of square inner cross-section with rounded corners the inside length measured face to face as illustrated at 72 of each side of which was about 2.6 inches (6.6 cm.) to approximate the inner cross-sectional area of the circular conduit using commercially available square conduit. The square conduit substituted for circular conduit for these tests extended from a point about 3 ft. (91 cm.) below the inlet 52 downwardly for a distance of about 15 feet (4.6 meters). At the lower end thereof, the vertically disposed square conduit portion was attached to conventional circular piping which then extended back to the feed tank 12 and compressed air supply 18. The pulverized coal flow rate varied between about 6.5 and about 6.8 tons per hour (5902 and 6174 kg. per hour) except the flow rate was 7.5 tons per hour (6810 kg. per hour) during test 6.

TABLE I

| Test No. | Flow Velocity through inlet (ft. per sec.) | Inlet Conduit Shape | Max. Dev. (%) | Sample Standard Deviation (%) | | No. of Outlets Within 3% of Mean | No. of Outlets Within 5% of Mean |
| --- | --- | --- | --- | --- | --- | --- | --- |
| 1 | 60 | Circular | 21.2 | 8.9 | | 7 | 10 |
| 2 | 60 | Circular | 16.3 | 8.7 | 8.8 Aver. | 4 | 6 |
| 3 | 60 | Square | 9.1 | 4.9 | | 6 | 10 |
| 4 | 60 | Square | 9.5 | 4.2 | 4.55 Aver. | 7 | 13 |
| 5 | 100 | Circular | 14.5 | 6.8 | | 5 | 7 |
| 6 | 100 | Circular | 21.5 | 8.9 | 7.85 Aver. | 2 | 7 |
| 7 | 100 | Square | 15.3 | 5.9 | | 6 | 11 |
| 8 | 100 | Square | 14.4 | 6.7 | 6.3 Aver. | 5 | 10 |

Table II is a compilation of results obtained in tests on the same distributor wherein the inlet conduit was of the circular cross-section throughout its vertical length for tests 9 through 12. It should be noted that tests 13 and 14 are the same as tests 3 and 4 respectively and are provided in both tables for added clarity of presentation of the results. During tests 15 and 16, the square conduit substituted for circular conduit for these tests extended from a point about 3 ft. (91 cm.) below the inlet 52 downwardly for a distance of about 12 feet (3.7 meters). In terms of the hydraulic radius of the square conduit portion, it extended downwardly from a point within a distance equal to about 55 times its hydraulic radius from the inlet for a distance equal to about 222 times the hydraulic radius. The distance 66 was also increased from about 1.125 inches (2.86 cm.) to about 37.125 inches (94.3 cm.) for these tests as indicated in the table. These tests were conducted at a flow velocity in the inlet conduit 28 of about 60 ft. per sec. (18 meters per sec.) and at a flow rate of about 6.7 tons per hour (6084 kg. per hr.). Otherwise, the square and circular pipe dimensions and the dimensions of the distributor were the same as specified for Table I.

TABLE II

| Test No. | Distance 66 (Inches) | Inlet Conduit Shape | Max. Dev. (%) | Sample Standard Deviation (%) | | No. of Outlets Within 3% of Mean | No. of Outlets Within 5% of Mean |
| --- | --- | --- | --- | --- | --- | --- | --- |
| 9 | 1.125 | Circular | 11.7 | 7.3 | | 4 | 7 |
| 10 | 1.125 | Circular | 11.9 | 7.4 | 7.35 Aver | 4 | 7 |

TABLE II-continued

| Test No. | Distance 66 (Inches) | Inlet Conduit Shape | Max. Dev. (%) | Sample Standard Deviation (%) | | No. of Outlets Within 3% of Mean | No. of Outlets Within 5% of Mean |
| --- | --- | --- | --- | --- | --- | --- | --- |
| 11 | 37.125 | Circuiar | 10.5 | 4.9 | | 7 | 10 |
| | | | | | 5.15 | | |
| 12 | 37.125 | Circular | 10.7 | 5.4 | Aver. | 7 | 10 |
| 13 | 1.125 | Square | 9.1 | 4.9 | | 6 | 10 |
| | | | | | 4.55 | | |
| 14 | 1.125 | Square | 9.5 | 4.2 | Aver. | 7 | 13 |
| 15 | 37.125 | Square | 9.7 | 4.4 | | 8 | 12 |
| | | | | | 3.85 | | |
| 16 | 37.125 | Square | 5.6 | 3.3 | Aver. | 10 | 14 |

For the purposes of this specification and the claims, a sample standard deviation is defined as the square root of the summation of the squares of the deviations of each of the members of the class from the mean divided by one less than the number of squares in the summation of squares. The sample standard deviation is a well known statistical term for measurement of the dispersion of a frequency distribution and can be calculated for a distributor utilizing mathematical and engineering principles of common knowledge to those of ordinary skill in the art to which this invention pertains.

Table III is a compilation of results obtained in tests on another distributor having an inner diameter 64 of about 15 inches (38 cm.), a distance 66 of about 37 inches (94 cm.), a distance 68 between the inlet 52 and the top of the cone 56 of about 10 inches (25 cm.), and a distance 70 between the centerplane of the outlets and the top plate of about 12 inches (30 cm.). The distributor had 16 outlets spaced around the circumference thereof and each outlet had an inside diameter of about 1.16 inches (2.95 cm.). Throughout the tests, the flow velocity was maintained at about 90 ft. per sec. (27 meters per sec.) with the exception of test 17 wherein the flow velocity was about 60 ft. per sec. (18 meters per sec.). For tests 17 and 18, the inlet conduit throughout its vertical length was of circular cross-section and its inside diameter was about 2.9 inches (7.4 cm.). For tests 19, 20, and 21, the circular conduit was replaced over a distance vertically of about 34 feet (10.4 meters) from the inlet by conduit having a square inner cross-section with rounded corners the face-to-face inside length of each side of which was about 2.6 inches (6.6 cm.). The square pipe extended vertically upwardly to and terminated at a point about 2 ft. (61 cm.) from the inlet to the distributor from which point a circular pipe about 2 ft. (61 cm.) in length and having an inside diameter of about 2.9 in. (7.4 cm.) extended to the inlet. During test 21, two of the outlets from the distributor were closed. The pulverized coal flow rate was within the range of about 8.2 to 8.7 tons per hour (7446 to 7900 kg. per hour) for each test except test 17 wherein the flow rate was about 5.3 tons per hour (4812 kg. per hour).

TABLE III

| Test No. | Inlet Conduit Shape | Max. Dev. (%) | Sample Standard Deviation (%) | No. of Outlets Within 3% of Mean | No. of Outlets Within 5% of Mean |
| --- | --- | --- | --- | --- | --- |
| 17 | Circular | 14.5 | 8.12 | 2 | 8 |
| 18 | Circular | 13.3 | 8.16 | 2 | 6 |
| 19 | Square | 10.3 | 4.99 | 6 | 11 |
| 20 | Square | 8.9 | 5.16 | 6 | 10 |
| 21 | Square | 9.6 | 4.56 | 8 | 11 |

Figure 3:
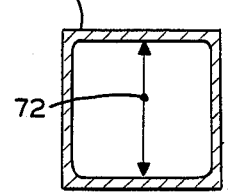
FIG. 3 is an enlarged view taken along lines 3—3 of FIG. 2.

Although occasional exceptions may occur such as indicated by a comparison of tests 5 and 8, from the remaining tests it can be concluded that when conduit of square inner cross-section is substituted for circular distributor inlet conduit, the sample standard deviation of distribution variation of gas entrained particles at the distributor outlets 54 under normal flow conditions is generally at least 5 percent less than the sample standard deviation of distribution variation of the gas entrained particles at the distributor outlets under the same flow conditions when the conduit portion is of circular cross-section and has the same inner cross-sectional area for fluid flow. By normal flow conditions is meant the range of conditions of flow rate and flow velocity for which a distributor of gas entrained particles is designed for operation. These test results further show that the maximum deviation from the mean is decreased significantly and that the number of outlets at which the deviation is within 3 percent of the mean distribution is increased significantly when the square conduit is substituted for circular conduit.

It is believed that inlet conduit portions having other non-circular inner cross-sectional shapes such as, for example, triangular, pentagon-shaped, and other polygon-shaped cross-sections wherein adjacent sides form a substantial angle to thereby prevent initiation and continuance of the "spiralling" effect will provide similar beneficial results.

It should be noted that each test in Tables I and II was conducted twice and the average sample standard deviation was calculated and is indicated as such in the tables. Therefore, in order to improve the flow distribution of gas entrained particles from a plurality of distributor outlets of a pneumatic transport system in accordance with the present invention, there is provided in the inlet line to the distributor a conduit portion, as illustrated at 74 in FIGS. 2 and 3, of non-circular inner cross-section for flowing gas entrained particles to the inlet 52 in a distribution pattern such that the average sample standard deviation of distribution variation of gas entrained particles at the distributor outlets 54 under normal flow conditions is at least 5 percent less than the average sample standard deviation of distribution variation of the gas entrained particles at the distributor outlets 54 under the same flow conditions when the conduit portion is of circular inner cross-section and has the same cross-sectional area. The tables show a total of at least 5 tests run with an inlet conduit portion of square cross-section and compared with at least 5 corresponding tests run with conduit of circular cross-section throughout its vertical length. The tests consistently showed (with an exception being test 8 when compared to test 5) an improvement in the sample standard deviation when a portion of the inlet conduit is of square cross-section of at least 5 percent. For the purposes of establishing an average sample standard deviation for a particular inlet conduit, an "average sample standard distribution" is defined herein for the purposes of the claims as the average of the sample standard distribution of each of five tests under the same flow conditions. Preferably, the conduit portion 74 has a square inner cross-section, as shown in FIG. 3. The corners may be rounded as illustrated and as normally found in conventional square conduit. Although the minimum required length of suitable non-circular conduit has not been determined, it can be concluded from the test results described hereinbefore that a conduit portion of square inner cross-section which has a length illustrated at 76 equal to at least about 222 times its hydraulic radius and which extends vertically upwardly and terminates within a distance illustrated at 78 of about 55 times its hydraulic radius from the inlet 52 is satisfactory.

During operation of the distributor 30 used for the tests of Table III with conduit of square cross-section installed, in order to corroborate the test results, the distributor was operated with the top cover removed while attempting to detect the previously observed circular inlet conduit effects, and the previously observed "spinning" or "whirlwind" effects were not observed.

As a greater amount of coal is burned at the tuyeres 34 of a blast furnace, the amount of more expensive coke which is required to be burned per unit of production may be reduced accordingly. However, only a certain amount of pulverized coal can be burned per unit of time at a tuyere. Thus, if a greater amount of pulverized coal is delivered to that tuyere than can be burned because of an unequal distribution of coal to the tuyeres, then the additional amount will not burn and will go up the stack and be wasted, and a lesser percentage of more expensive coke will be replaced by the total pulverized coal distributed by the distributor 30.

To illustrate the potential savings that the lower maximum deviations provided by the square conduit of the present invention will have on blast furnace operation, the following is a typical example of calculation of the cost savings where it is assumed that the furnace production is 5000 THM per day (THM means tons hot metal), the amount of coke required if pulverized coal injection is not used is 1100 pounds per THM, the cost of coke is $100 per ton, the cost of coal is $50 per ton, and the ratio of coal to coke replacement is 1:1. If 20 percent of the coke can be replaced when the maximum deviation from the mean is 10 percent, the fuel cost would be calculated as follows:

| | |
|---|---|
| 220 lbs. coal @ $50 per ton = | $5.50 |
| 880 lbs. coke @ $100 per ton = | $44.00 |
| | $49.50 per THM |

If the injection rate is limited by the tuyere with the highest coal rate, the overall injection rate could be increased when the maximum deviation from the mean is reduced since the coal rate at each of the tuyeres would be closer to the mean deviation. If the maximum deviation from the mean is reduced to 9 percent, the coal rate could be increased to 222 lbs. per THM, and the fuel cost would be calculated as follows:

| | |
|---|---|
| 222 lbs. of coal at $50 per ton = | $5.55 |
| 878 lbs. of coke at $100 per ton = | $43.90 |
| | $49.45 per THM |

The savings of 0.05 dollars per THM would amount to $250 per day of operation (5000×0.05). It should be observed that these savings are made at essentially no cost when the square conduit is installed on a new system. If an existing pipe portion is replaced, it may probably take less than a month of operation to pay for the replacement.

It is to be understood that the invention is by no means limited to the specific embodiments which have been illustrated and described herein, and that various modifications thereof may indeed be made which come within the scope of the present invention as defined by the appended claims.

We claim:

1. A pneumatic transport and distribution system comprising at least one distributor which includes a vertically disposed right cylindrical chamber having a tubular side wall, a top plate, a bottom plate having a downwardly diminishing diameter, an inlet opening centrally disposed in the bottom plate, and a plurality of outlet openings in the side wall for passing gas entrained particles through said distributor, and means defining a vertically extending conduit portion of non-circular inner cross-section for flowing gas entrained particles to said inlet opening in a distribution pattern such that the average sample standard deviation of distribution variation of gas entrained particles at the distributor outlets under normal flow conditions is at least 5 percent less than the average sample standard deviation of distribution variation of the gas entrained particles at the distributor outlet openings under the same flow conditions if the conduit portion is of circular inner cross-section and has the same inner cross-sectional area.

2. A system as in claim 1 wherein said conduit portion inner cross-section has the shape of a polygon.

3. A system as in claim 1 wherein said conduit portion has a rectangular inner cross-section.

4. A system as in claim 1 wherein said conduit portion has a square inner cross-section.

5. A system as in claim 4 wherein said conduit portion has a length which is equal to at least about 222 times said conduit portion hydraulic radius, and terminates at a distance from said inlet opening which is less than about 55 times said conduit portion hydraulic radius.

6. A system as in claim 1 wherein the system is adapted for injecting air entrained pulverized coal into a plurality of tuyeres of a blast furnace, and the system further comprises conduit means for connecting said tuyeres to said distributor outlet openings.

7. A system as in claim 6 wherein said conduit portion has a square inner cross-section, a length which is equal to at least about 222 times said conduit portion hydraulic radius, and terminates at a distance from said inlet opening which is less than about 55 times said conduit portion hydraulic radius.

8. A pneumatic transport and distribution system comprising at least one distributor which includes a vertically disposed right cylindrical chamber having a tubular side wall, a top plate, and a bottom plate having a downwardly diminishing diameter, means including an inlet opening centrally disposed in the bottom plate and a plurality of outlet openings in the side wall for passing gas entrained particles through said distributor, a conduit connected to said inlet opening in the bottom plate for flowing gas entrained particles vertically to said inlet opening, and means comprising at least a vertically extending portion of said conduit which has a square inner cross-section for preventing spiralling of the particles as they emanate from said inlet opening into the distributor.

9. A system as in claim 8 wherein said conduit portion has a length which is equal to at least about 222 times said conduit portion hydraulic radius, and terminates at a distance from said inlet opening which is less than about 55 times said conduit portion hydraulic radius.

10. A system as in claim 8 wherein the system is adapted for injecting air entrained pulverized coal into a plurality of tuyeres of a blast furnace, and the system further comprises conduit means for connecting said tuyeres to said distributor outlet openings.

11. A system as in claim 10 wherein said conduit portion has a length which is equal to at least about 222 times said conduit portion hydraulic radius, and terminates at a distance from said inlet opening which is less than about 55 times said conduit portion hydraulic radius.

12. A pneumatic transport and distribution system comprising at least one distributor which includes a vertically disposed right cylindrical chamber having a tubular side wall, a top plate, and a bottom plate having a downwardly diminishing diameter, means including an inlet opening centrally disposed in the bottom plate and a plurality of outlet openings in the side wall for passing gas entrained particles through said distributor, and means defining a vertically extending conduit portion of polygonal inner cross-section for flowing gas entrained particles to said inlet opening while preventing spiralling of the particles as they emanate from said inlet opening into the distributor.

13. A system as in claim 12 wherein said conduit portion has a rectangular inner cross-section.

14. A system as in claim 12 wherein said conduit portion has a square inner cross-section.

15. A system as in claim 14 wherein said conduit portion has a length which isequal to at least about 222 times said conduit portion hydraulic radius, and terminates at a distance from said inlet opening which is less than about 55 times said conduit portion hydraulic radius.

16. A system as in claim 14 wherein the system is adapted for injecting air entrained pulverized coal into a plurality of tuyeres of a blast furnace, and the system further comprises conduit means for connecting said tuyeres to said distributor outlet openings.

17. A system as in claim 16 wherein said conduit portion has a length which is equal to at least about 222 times said conduit portion hydraulic radius, and terminates at a distance from said inlet opening which is less than about 55 times said conduit portion hydraulic radius.

18. A method of improving the flow distribution of gas entrained particles from a plurality of distributor outlets of a pneumatic transport and distribution system which includes a vertically disposed right cylindrical chamber having a tubular side wall, a top plate, a bottom plate having a downwardly diminishing diameter, an inlet opening centrally disposed in the bottom plate, a plurality of outlet openings in the side wall, and a pipe of circular inner cross-section for flowing gas entrained particles to the inlet opening in the bottom plate and at least a portion of which extends vertically to said inlet opening, the method comprises replacing at least a portion of the vertically extending pipe portion with a conduit portion having a square inner cross-section.

19. A method according to claim 18 further comprising selecting the length of the square conduit portion so that it is equal to at least about 222 times the square conduit portion hydraulic radius, and disposing the square conduit portion within a distance from the distributor inlet opening which is equal to about 55 times the square conduit portion hydraulic radius.

* * * * *